United States Patent
von Strombeck et al.

(10) Patent No.: US 6,799,708 B2
(45) Date of Patent: Oct. 5, 2004

(54) DEVICE FOR JOINING WORKPIECES BY FRICTION STIR WELDING

(75) Inventors: Alexander von Strombeck, Hamburg (DE); Jorge Dos Santos, Lüneburg (DE)

(73) Assignee: GKSS - Forschungszentrum Geesthacht GmbH, Geesthacht (DE)

( * ) Notice: Subject to any disclaimer, the term of this patent is extended or adjusted under 35 U.S.C. 154(b) by 0 days.

(21) Appl. No.: 10/172,817

(22) Filed: May 16, 2002

(65) Prior Publication Data

US 2002/0179673 A1 Dec. 5, 2002

Related U.S. Application Data

(63) Continuation-in-part of application No. PCT/DE00/04033, filed on Nov. 16, 2000.

(30) Foreign Application Priority Data

Nov. 18, 1999 (DE) .......................................... 199 57 136

(51) Int. Cl.[7] ........................ B23K 20/12; B23K 37/00; B23K 1/14; B23K 37/04
(52) U.S. Cl. ...................... 228/2.1; 228/112.1; 228/49.4
(58) Field of Search ........................... 228/112.1–114.5, 228/114, 49.1, 49.4, 44.3, 2.1–2.3, 44.7, 113

(56) References Cited

U.S. PATENT DOCUMENTS

| | | | | |
|---|---|---|---|---|
| 5,460,317 A | * | 10/1995 | Thomas et al. .......... | 228/112.1 |
| 5,713,507 A | * | 2/1998 | Holt et al. ................ | 228/112.1 |
| 5,794,835 A | * | 8/1998 | Colligan et al. ............. | 228/2.1 |
| 6,050,474 A | * | 4/2000 | Aota et al. ................ | 228/112.1 |
| 6,199,745 B1 | * | 3/2001 | Campbell et al. ......... | 228/112.1 |
| 6,237,829 B1 | * | 5/2001 | Aota et al. .................... | 228/2.1 |
| 6,237,835 B1 | * | 5/2001 | Litwinski et al. ......... | 228/112.1 |
| 6,367,681 B1 | * | 4/2002 | Waldron et al. .......... | 228/112.1 |
| 6,419,142 B1 | * | 7/2002 | Larsson ...................... | 228/2.1 |
| 2002/0179674 A1 | * | 12/2002 | Schilling et al. ............. | 228/2.1 |
| 2002/0179682 A1 | * | 12/2002 | Schilling et al. .......... | 228/112.1 |

FOREIGN PATENT DOCUMENTS

EP        0 810 055 A1 * 12/1997

* cited by examiner

Primary Examiner—Stanley S. Silverman
Assistant Examiner—Colleen P. Cooke
(74) Attorney, Agent, or Firm—Klaus J. Bach

(57) ABSTRACT

In a device for butt joining workpieces by friction stir welding along a connecting area, including a shaft having a driven end and, at the opposite end, a pin-like projection to be disposed in the connecting area of the workpieces, whereby, upon rotation of the shaft, the workpiece material in contact with the pin-like projection is plasticized, first and second stops with first and second shoulders are provided on the device and disposed at opposite sides of the workpieces and at least one of the stops is movable relative to the other and biased toward the other with a controllable force for engaging the workpieces between the shoulders of the stops during the friction stir welding procedure.

11 Claims, 3 Drawing Sheets

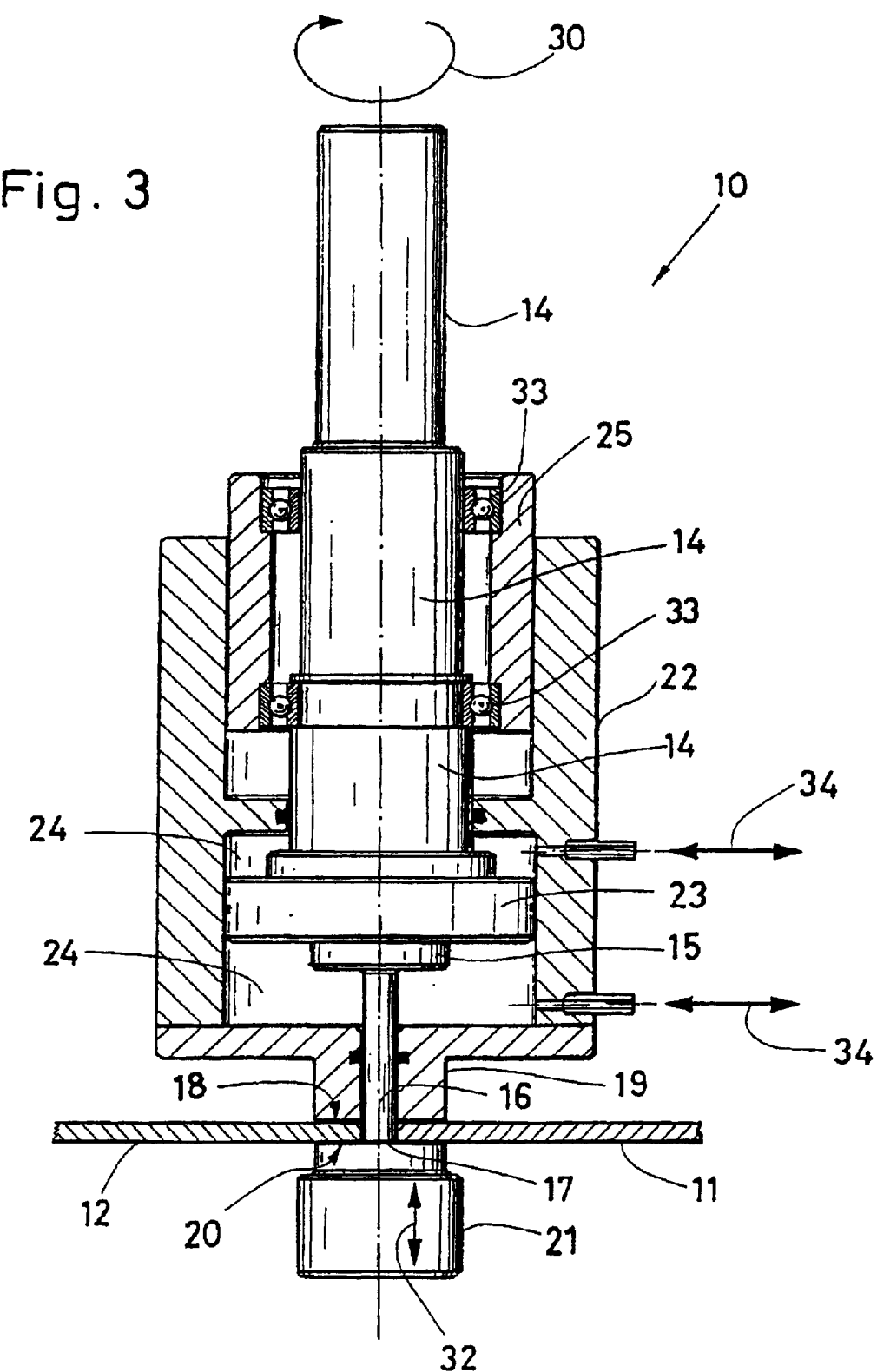

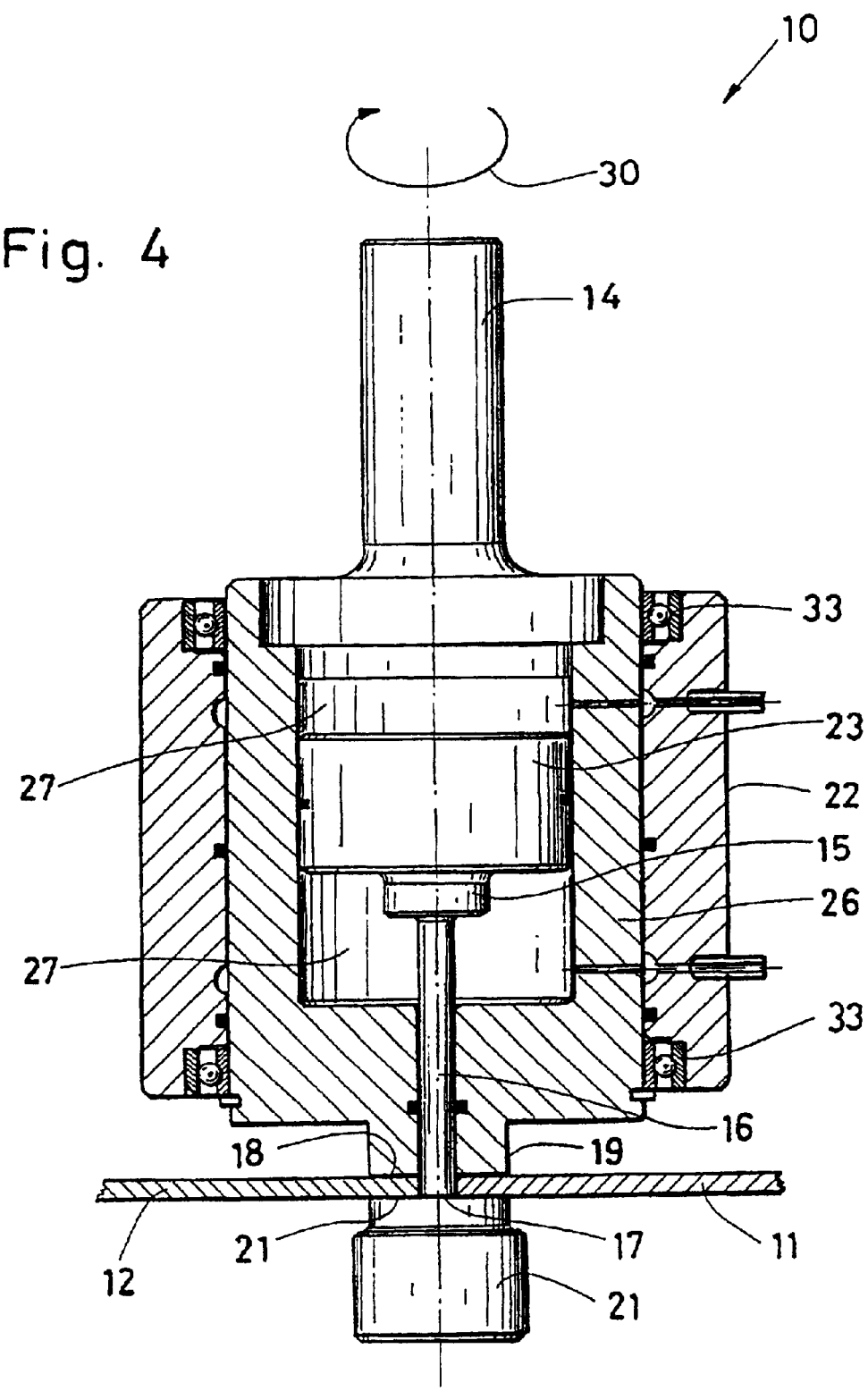

DEVICE FOR JOINING WORKPIECES BY FRICTION STIR WELDING

This is a Continuation-In-Part application of international application PCT/DE00/04033 filed Nov. 16, 2000 and claiming the priority of German application 199 57 136.8 filed Nov. 18, 1999.

BACKGROUND OF THE INVENTION

The invention relates to a device for joining workpieces by the method known as friction stir welding, wherein the workpieces are disposed adjacent one another in the areas in which they are to be joined. The device includes a rotatable shaft with a free end forming a first shoulder and being provided with a pin-like projection which, while being rotated at high speed is moved into contact with the workpieces and plasticizes the workpieces in the contact area. At its free end, the pin-like projection is provided with a second shoulder having a diameter larger than the pin-like projection so as to form between the first and second shoulders a space in which the workpieces are accommodated.

A friction stir welding apparatus is known for example from EP-B-0 615 480. The friction stir welding (FSW) has been known basically for several years and has been continually further developed. Originally, the friction stir welding was performed in such a way that two workpieces which were to be joined by friction stir welding were moved relative to each other in the area in which they were to be joined while they were pressed against each other with a predetermined adjustable force. As a result of the heat generated by the friction, the material of the workpieces was finally plasticized in the area of jointure. Upon sufficient plastification, the materials of the two workpieces intermix sufficiently so that, upon cooling, the desired weld connection between the two workpieces is formed.

In the apparatus referred to above, a pin-like projection which is rotated by a drive or, respectively, a motor at a suitably high speed, is placed between the adjoining edges of two workpieces disposed adjacent each other. The pin-like projection is suitably guided for example by a special guide structure or a robot and moved, for example, along a butt seam of the workpieces to be joined. When, after the beginning of the welding procedure, the material of the workpieces is sufficiently plasticized by the frictional heat generated by the rotation of the pin-like projection, the pin-like projection is moved along the seam between the adjoining workpieces while the pin-like projection is continued to be rotated whereby an elongated continuous butt weld is formed.

With the known apparatus, the workpieces are held in the area of the butt joint in spaced relationship by two stops with a diameter exceeding that of the pin-like projection which is disposed between the two stops. The opposite sides of the two stops form quasi-shoulders, which are disposed at opposite sides of the workpieces in the area of the welding seam to be formed and which rotate adjacent the surfaces of the workpieces to be joined. If, for example, a pressure is applied by the apparatus normal to the surfaces at one side of the two workpieces, the engagement pressure at the opposite side of the workpieces to be joined is correspondingly reduced because the shoulders are disposed at a certain distance from each other. For this reason, a suitable counter support must be provided by separate support means, which can be provided at reasonable expenses for plate-like workpieces such as metal sheets but which is generally impossible to provide for friction stir welding joints of workpieces having a complicated shape.

Furthermore, in many manufacturing operation, for example, in motor vehicle or airplane manufacturing, manufacturing robots are used which have multiple functions and relatively large outer supports for establishing the weld joint not only form obstacles but can simply not be provided. In addition, the robots can generally not provide the relatively large engagement forces or they can provide them only with high additional expenses.

It is desirable to eliminate the need for a robot to provide large forces and to provide a large operational area for the robot and furthermore to reduce the loads on the workpieces to be joined.

It is therefore the object of the present invention to provide a device for joining workpieces by friction stir welding, wherein, for forming a weld seam in accordance with the friction stir welding procedure, no welding seam support or rather no outer support structure is required and whereby also welding seams extending three-dimensionally can be produced in such a way that no plasticized material can escape. With the use of manufacturing robots, no large forces should be required from the robots for forming the weld seam and the workpieces to be joined should be held close together in the area in which they are to be welded together without the need for outer support means. Furthermore, the devices should be inexpensive and simple.

SUMMARY OF THE INVENTION

In a device for butt joining workpieces by friction stir welding along a connecting area, including a shaft having a driven end and, at the opposite end, a pin-like projection to be disposed in the connecting area of the workpieces, whereby, upon rotation of the shaft the workpiece material in contact with the pin-like projection is plasticized, first and second stops with first and second shoulders are provided on the device and disposed at opposite sides of the workpieces and at least one of the stops is movably relative to the other and biased toward the other with a controllable force for engaging the workpieces therebetween during the friction stir welding procedure.

The advantage of the solution according to the invention resides mainly in the fact that the forces required for the engagement of the workpieces to be joined are generated internally in the device so that no outer support structure is required. As a result, welding seams can be made also with complicated workpieces for example welding seams which extend three dimensionally in the space can be made without the need for a support which, so far, was needed to secure the base of the seam and to support the workpieces. Also, the workpieces are not warped during the establishment of the welding seam, or even destroyed. By the engagement of the stops or, respectively, the shoulders of the two stops with the respective sides of the workpieces to be joined, also material plasticized during the welding procedure cannot escape. In summary, it can be said the device according to the invention has the advantage that the engagement forces are provided by the stops disposed at opposite sides of the workpieces and these forces are oppositely directed so that they cancel each other and do not bias the workpieces toward one side or the other. In this way, also thin-walled workpieces can be welded together without being damaged. Also, workpieces in the form of hollow profile structures can be welded in this way and workpieces of complicated shapes which could not be achieved with the known apparatus. Finally, also the flexibility of the friction stir welding is increased with the device according to the invention beyond what has been achievable with prior art equipment.

In a preferred embodiment of the invention, a housing is provided for supporting and guiding a shaft, which includes a piston element provided with a pin-like projection. The piston is axially movable back and forth in a cylinder formed in the housing. By suitable actuation of the piston the thickness of the workpieces to be joined can be taken into account and the force desired for the engagement of the workpieces for forming the welding seam can be easily generated.

It is basically possible to provide for the back and forth movement of the piston element and consequently, the pressure applied to the workpieces engaged between the two stops in various ways, for example, electromotively or pneumatically. It has been found however, to be particularly advantageous to operate the piston hydraulically especially of the robot is operated by hydraulically since pressurized hydraulic fluid is then available at the location of the device.

The pressure applied to the opposite sides of the workpieces in the area in which the welding seam is to be formed may be adjusted as desired, as pointed out already earlier, depending on the type of workpieces or the shape of the workpieces and depending on the workpiece material. However, the device is preferably so designed that it is capable of providing between the shoulders of the two stops a force of up to 1.5 tons and possible even a greater force.

In the prior arrangements, both stops and therefore both shoulders at the opposite sides of the workpiece are rotating together with the welding pin. It is however expedient for certain applications if only one of the shoulders disposed adjacent the welding seam surface is rotatable while the other remains stationary. It is then advantageous if the housing of the device is stationary and the stop including the first shoulder is connected to the housing. The application of the suitable engagement force is independent therefrom. The housing is held stationary by suitable means and together therewith the stop connected to the housing in such an embodiment.

The shaft is preferably supported in the housing by a guide structure formed with housing so as to be axially movable so that the shaft can be moved axially by the piston for applying the engagement forces to the workpieces.

In another advantageous embodiment of the device, a housing is provided with a guide element, which is connected to the shaft and cylinder space, is disposed within the guide element. A piston, which is axially movable in the cylinder space, includes a pin-like projection forming the welding tool. If the stop with the first shoulder is connected to the guide element also the first stop and the shoulder thereof rotate with the shaft in unison with the second shoulder and the second stop. In this embodiment, the stops and the respective shoulders at both sides of the workpieces to be joined are rotating in unison.

In an embodiment with an outer stationary housing, the pin-like projections and the second stop connected thereto is to rotate with the shaft of the device. In this connection, it is principally possible to provide in the cylinder axial guide structures by which the piston is engaged so that it rotates together with the cylinder. For example, axial groove and key arrangements could be provided. It is however particularly advantageous if the piston and the cylinder have an essentially elliptical cross-section so that the piston is engaged for rotation with the cylinder.

The invention will be described below in greater detail on the basis of the accompanying drawings.

BRIEF DESCRIPTION OF THE DRAWINGS

FIG. 3 is a cross-sectional side view of a first embodiment of the device according to the invention, and FIG. 4 is a cross-sectional side view of a second embodiment of the device according to the invention.

DESCRIPTION OF PREFERRED EMBODIMENTS

Figure 1:
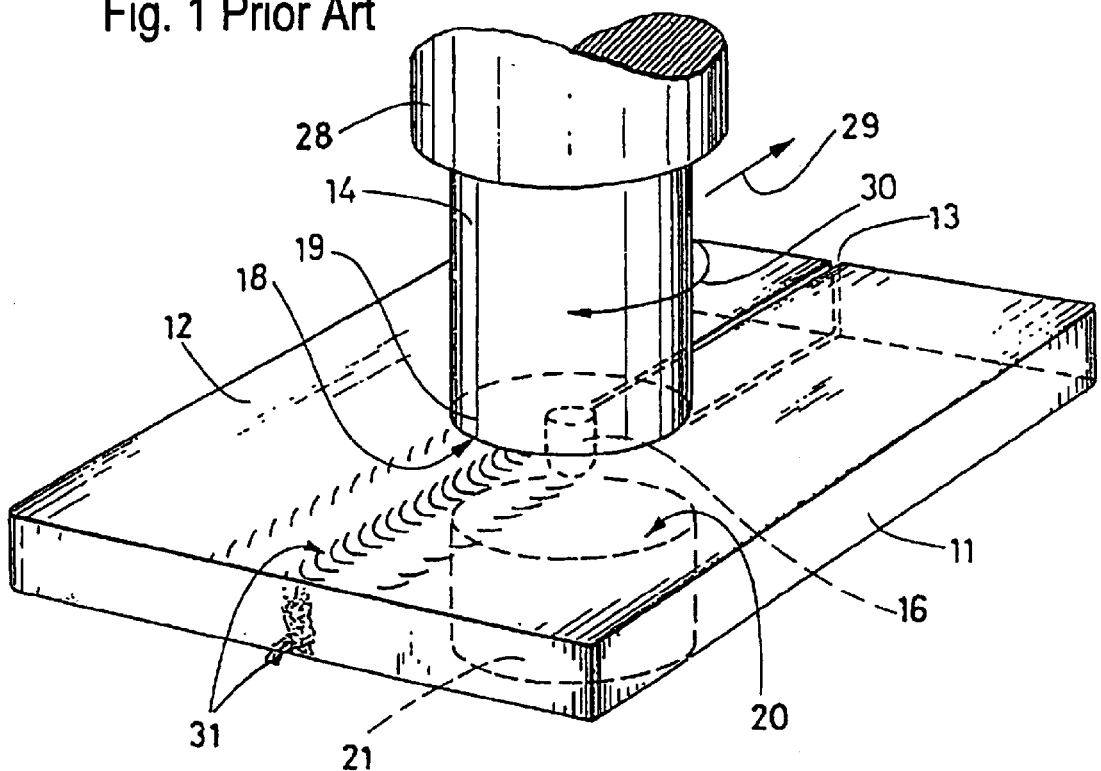
FIG. 1 is a partial perspective view showing the friction stir welding procedure using a device as it is used, in principle, for such welding tasks.

On the basis of FIG. 1, which shows the state of the art, the friction stir welding procedure is first shortly explained, since the principle is basically used by the device 10 according to the invention as shown in FIGS. 3 and 4.

Two workpieces 11 and 12 which are shown as plates are placed next to each other so as to abut each other along an area where they are to be joined by a butt weld seam 31. At the ends to be joined, that is, in the connection area 13, a small space is provided. The two workpieces 11 and 12 are pressed toward each other against support spacers, which are not shown in the Figure so that they cannot move during the welding procedure.

Figure 2:
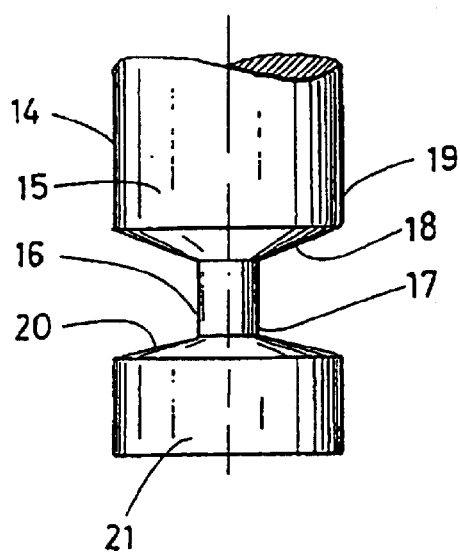
FIG. 2 is a perspective view of the front end of a device for friction stir welding wherein two spaced shoulders are provided between which the mark pieces are received.

A shaft 14, which can be rotated by drive means 28 as indicated by the arrow 30 is provided at its end 15 remote from the drive means 28 with a first shoulder 18 which forms a first stop 19, see also FIG. 2. At the end 17 of the pin-like projection remote from the drive means 28 a second stop 21 is provided which forms a second shoulder 20 directed toward the pin-like projection 16. The axial distance between the first and the second shoulders 18, 20 is fixed in the device of the prior art. By rotating the shaft 14, and together therewith the pin-like projection 16, the material of the workpieces 11 and 12 is plasticized between the opposite shoulders 18 and 20 by friction heating when the pin-like projection is moved into the connection area 13 of the two workpieces. The plasticized materials of the two workpieces 11 and 12 intermix and form a weld seam 31, see the completed weld seam at the left end of the seam shown in FIG. 1. The rotating pin-like projection 16 is moved in the direction of arrow 29 along the connection area 13 by suitable guide and drive means. This procedure is applicable generally also to the device according to the invention 10 as shown in FIGS. 3 and 4.

The device 10 according to the invention, in the embodiment as shown FIG. 3 differs from the state of the art in that the second stop 21 and, together therewith, the shoulder 20 is movable axially back and forth with respect to the shoulder 18 (arrow 32) in order to engage the workpieces with a predetermined force between the two shoulders 18 and 20 of the two stops 19 and 21. For generating this engagement force, a housing 22 is provided in which the shaft 14 is rotatably supported by bearings 33 in an axially movable guide structure 25. At the end 15 of the shaft 14, a piston element 23 is provided which is axially movably supported in a cylinder chamber 24, which is also formed in the housing 22. The shaft 14 is provided with a pin-like projection 26 forming a welding tool. The piston element 23 is sealed in the walls of cylinder chamber 24 in a suitable manner so that no flow connection exists between the cylinder chambers 24 at opposite sides of the piston or between the chambers 24 and the rest of the housing 22 in which the guide structure 25 is disposed. By way of communication lines which are only indicated in the figures pressurized hydraulic fluid 34 is supplied selectively to the chambers 24 or removed therefrom whereby the housing 22 and together therewith the first stop 19 are moved back and forth, see arrow 32. In this way, it is made sure that, depending on the pressurization of the hydraulic fluid chambers 24, a suitable engagement pressure between the first and the second stop 19 and 21 can be established, or respectively, between the first and the second shoulder 18, 20, between which the two workpieces are disposed thereby providing for an engagement force of the two workpieces which is independent of the thickness of the workpieces.

By support means which are not shown in the drawings, for example, by stops on a drive motor or on a manufacturing robot on which the device 10 is mounted the housing 22 is retained stationary that is non-rotating relative to the shaft 14. The stop 19 provided on the housing 22 are then also stationary relative to the shaft 14.

In the embodiment according to FIG. 4, parts essentially identical to those shown in FIG. 3 are indicated by the same reference numerals. Also in this embodiment, the outer housing 22 is stationary with respect to the shaft 14. Other than in the embodiment shown in FIG. 3, the embodiment of FIG. 4 includes in the housing 22 a guide element 26, which is not axially movable relative to the housing 22 but which is rotatably supported in the housing 22 by bearings 33 and which is rotatable together with the shaft 14. The guide element 26 includes a cylinder space 27 in which a piston 23 is disposed. The piston 23 is provided with a pin-like projection 16 and is movable back and forth by the admission or removal of hydraulic fluid to or from the cylinder chambers 27 formed at opposite sides of the piston 23. The stop 19 forming the first shoulder 18 is provided on the guide element 26. In the embodiment shown in FIG. 4, the stop 19 is formed integrally with the guide element 26, but it could be provided by a separate element. The cylinder chambers 27 and the piston 23 have both an essentially elliptical cross-section so that they are rotatable in unison. In this way, rotation of the shaft 14 in the direction as indicated by the arrow 30 is transmitted to the piston 23 and to the pin-like projection 16, to which the second stop 21 is connected.

It is pointed out that the connection between the end 17 of the pin-like projection 16 and the second stop 21 may be releasable. Also, the pin-like projection 16 may be releasably connected to the end 15 of the shaft 14 remote from the drive means so that the pin-like projection 16 can be easily replaced if it is damaged or when it is worn by a new pin-like projection. The removability of the second stop 21 may further be advantageous when, for performing the welding procedure, the pin-like projection is to be moved into welding position in an axial direction of the pin that is when lateral positioning is not possible. It may be necessary to drill a hole into the connection area of the workpieces 11, 12 which hole has a diameter corresponding to the diameter of the pin-like projection 16 and to insert the pin-like projection, with the second stop removed, through the hole and then to re-mount the second stop onto the pin-like projection. The second stop may be mounted onto the pin-like projection for example by a thread or by another suitable connection.

In the embodiment of the device according to FIG. 4, the first stop 19 with the first shoulder 18 and the second stop 21 with the second shoulder 20 both rotate during the welding procedure. With the embodiment according to FIG. 3, the device may be arranged at an angle to the workpieces 11, 12, which is different from a normal 90° angle. Such an angle may be provided by a corresponding form of the shoulder 18.

In contrast to the arrangements as known in the art, the device according to the invention permits a control of the forces with which the workpieces 11, 12 are engaged between the stops 19, 21.

During rotation of the shaft 14, the force can be adjusted by a corresponding control of the hydraulic fluid admitted to the cylinder chambers 24 at opposite sides of the piston 23. Upon completion of the welding procedure, the two stops 19, 21 can be moved apart by an appropriate control of the hydraulic fluid 34 providing for the appropriate movement of the piston 23. Then the pin-like projection is released or, in connection with the above mentioned example with the hole in the connection area of the workpieces 11, 12, the pin-like projection is pulled out of a target hole at the end of the welding seam 31 after the second stop 21 has been removed.

It is finally pointed out that the material of which the pin-like projection 16 or the stops 19, 21 consist can be selected depending on the material of which the workpieces 11, 12 consist. The selection is to be made by an expert depending on the circumstances.

What is claimed is:

1. A device for joining workpieces by friction stir welding along a connecting area in which the work pieces are disposed closely adjacent one another along a connecting area, comprising: a shaft supported so as to be rotatable about its axis, said shaft having a driven end to be rotated and, at its end opposite the driven end, a pin-like projection for placement into the connecting area of said workpieces whereby the workpiece material, which, in the connecting area, is in contact with said pin-like projection, is plasticized by friction heat when said pin-like projection is rotated, said device including first and second stops with first and second shoulders disposed around said pin-like projection at opposite sides of said workpieces, at least one of said stops being axially movably supported, and means for biasing said at least one stop toward said other stop with a controllable predetermined force which is independent of thickness variations of said workplaces for controllably engaging said workpieces therebetween during the friction stir welding procedure.

2. A device according to claim 1, wherein said means for biasing said at least one stop toward the other includes a piston disposed in a cylinder and hydraulic pressure fluid selectively admitted to the cylinder at opposite sides of said piston.

3. A device according to claim 1, wherein said device includes a housing in which said shaft is rotatably and axially movably supported, said shaft carrying a piston element disposed in a cylinder formed in said housing, means for supplying hydraulic fluid in a controlled manner to said cylinder at opposite sides of said piston for axially moving said piston and said pin-like projection extending from said piston.

4. A device according to claim 2, wherein said piston and cylinder and said hydraulic fluid pressure are so selected as to be capable of providing an engagement force of up to 2.5 tons.

5. A device according to claim 2, wherein one of said first and second stops is stationary and the other is rotatable together with said pin-like projection.

6. A device according to claim 3, wherein said shaft is rotatably supported by a guide structure, which is axially movably supported in said housing.

7. A device according to claim 3, wherein said housing is stationary and said shaft is rotatably supported by a guide structure, which is axially movably supported in said housing.

8. A device according to claim 6, wherein one of said shoulders is formed by said housing.

9. A device according to claim 1, wherein a housing is provided and a guide element is rotatably supported in said housing and connected to said shaft for rotation therewith, said guide element including a cylinder space in which a piston is disposed and said pin-like projection is connected to said piston for axial movement therewith.

10. A device according to claim 9, wherein said first stop and the shoulder provided thereby is part of said guide element.

11. A device according to claim 9, wherein said cylinder space and said piston have an elliptical cross-section so that said piston and the pin-like projection connected thereto are rotating together with said guide element.

* * * * *